United States Patent [19]

Yip et al.

[11] Patent Number: 5,039,854

[45] Date of Patent: Aug. 13, 1991

[54] FLUORESCENT RADIATION COLLECTOR FOR IMAGE SCANNER

[75] Inventors: Kwok-leung Yip; John C. Boutet, both of Rochester, N.Y.

[73] Assignee: Eastman Kodak Company, Rochester, N.Y.

[21] Appl. No.: 520,294

[22] Filed: May 7, 1990

[51] Int. Cl.⁵ .............................................. G02B 6/00
[52] U.S. Cl. .......................... 250/327.2; 250/227.18; 250/227.23; 250/227.28; 350/96.1; 350/96.34
[58] Field of Search ...................... 250/227.18, 227.23, 250/227.28, 353, 327.2, 484.1; 350/96.10, 96.34

[56] References Cited

U.S. PATENT DOCUMENTS

| | | | |
|---|---|---|---|
| 4,149,902 | 4/1979 | Mauer et al. | 136/89 |
| 4,298,802 | 11/1981 | Quella et al. | 250/484 |
| 4,371,897 | 2/1983 | Kramer | 136/89 |
| 4,799,748 | 1/1989 | Brown | 350/96.1 |
| 4,884,860 | 12/1989 | Brown | 350/96.15 |

Primary Examiner—Carolyn E. Fields
Assistant Examiner—James Beyer
Attorney, Agent, or Firm—William F. Noval

[57] ABSTRACT

For use in an image scanner, a highly efficient multistage fluorescent radiation collector collects radiation emitted, reflected, or transmitted from an image storage medium. A first elongated light pipe member has a first fluorescent dye which absorbs radiation from the storage medium and emits radiation of another wavelength. A second elongated light pipe member located adjacent to but optically isolated from the first member has a second fluorescent dye which absorbs emitted radiation escaping from the first member and which emits radiation of a third wavelength. Preferably, a third elongated light pipe member located adjacent to but optically isolated from the second member has a third fluorescent dye which absorbs emitted radiation escaping from the second member and which emits radiation of a fourth wavelength. Much of the radiation emitted by the first, second, and third dyes is channelled along the respective first, second, and third light pipe members to radiation sensors at the end(s) of the members.

13 Claims, 4 Drawing Sheets

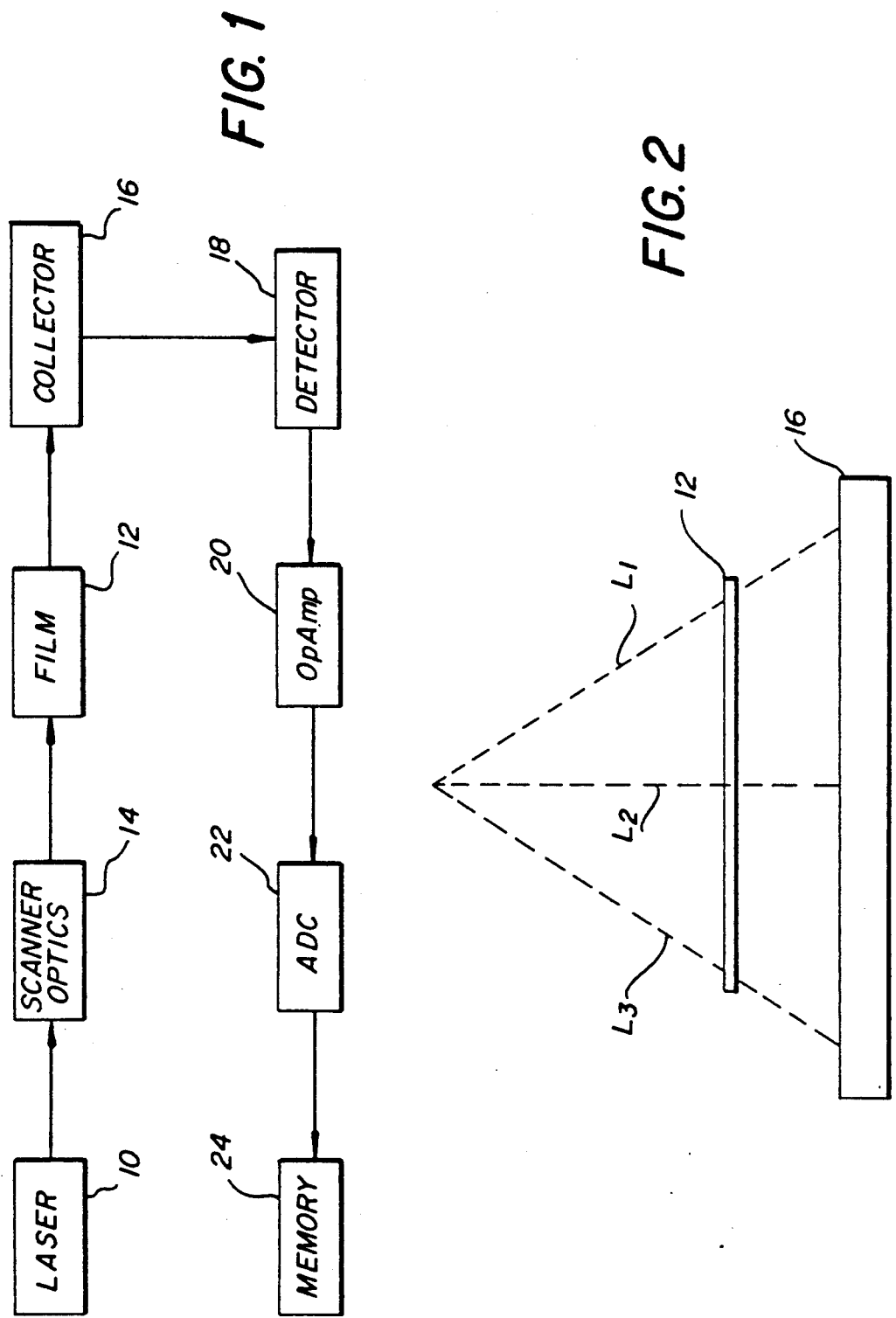

FLUORESCENT RADIATION COLLECTOR FOR IMAGE SCANNER

BACKGROUND OF THE INVENTION

This invention relates in general to image scanner apparatus for producing an electrical signal representative of a scanned image. More particularly, this invention relates to an image scanner having a highly efficient fluorescent radiation collector for collecting radiation emitted, reflected, or transmitted from an image scanner by a beam of radiation.

Information contained in documents or film is frequently converted to electrical signals in order to store, process, or transmit the information. Typically, the information is scanned by means of a beam of light produced by a flying spot scanner or a laser scanner. Radiation, which is emitted, transmitted, or reflected as a result of scanning, is collected and sensed by means of a radiation sensor which produces a signal representative of the scanned information. Thus, for example, the image contained in a medical X-ray film may be converted to a digital signal by means of a laser scanner system. In such a system, a laser beam is swept across the film by means of a rotating polygon mirror, while the film is moved at a constant velocity past the scanning laser beam. The laser radiation transmitted from the film is collected by a radiation collector in communication with a radiation sensor. The sensor produces a signal which is digitized and stored in a storage system, such as magnetic tape or optical disk.

In general, in such an image scanner, either an integrating tube or fiber optic bundle is used to collect radiation transmitted from the film. The collected radiation is detected by photomultiplier tubes or photodiodes. For diffuse density measurement in X-ray film scanners, it is desirable to gather both specularly transmitted radiation and scattered radiation from the film. Known light integrating tubes have low radiation collection efficiency and radiation collected along the scan line is generally non uniform. Similarly, a fiber optic bundle radiation collector has a collection efficiency which is limited by the numerical aperture of the fibers and field non-uniformity results from non uniformities in the fiber bundle.

In order to minimize these problems, fluorescent light collectors have been proposed to collect emitted or reflected light in image scanning apparatus. Thus, for example, U.S. Pat. No. 4,371,897, issued Feb. 1, 1983, patentee Kramer, discloses a fluorescent light collector for collecting light reflected from an information bearing surface. The light collector includes a generally cylindrical rod containing a fluorescent dye dispersed throughout a generally transparent medium. A photosensor is located at one end of the rod. Reflected light, incident on the light collector, is absorbed by the fluorescent dye which emits radiation at another wavelength. The emitted radiation is conducted by internal reflection in the light rod to the photosensor where it is converted to an electrical signal. The fluorescent light collector disclosed in Kramer is disadvantageous because both light collection efficiency and uniformity are adversely effected, (1) by the loss or leakage of light which is scattered at less than the critical total internal reflection angle of the rod (leaky mode light); and (2) by the surface scattering effects of contaminants or scratches on the exterior surfaces of the collector. As a result, the Kramer fluorescent light collector has low collection efficiency and end to end non uniformity of light collection (about + or − 28% without the use of a filter or apodization of the jacket enclosing the collector).

U.S. Pat. No. 4,298,802, issued Nov. 3, 1981, patentees Quella et al., discloses a fluorescent light collector comprising a transparent body which acts as a light trap. The body contains at least two different groups of fluorescent particles. Each group has a light absorption range and light emitting range which are different from the other groups. Although the disclosed fluorescent light collector increases the efficiency of broad band absorption of light by the use of multiple fluorescent dyes in a single light collector body, light collection efficiency is limited. This limited efficiency results from leaking light which is reflected at angles less than the critical total internal reflection angle. Moreover, surface scattering effects resulting from contaminants or scratches on the exterior surface of the collector are disadvantageous.

U.S. Pat. No. 4,149,902, issued Apr. 17, 1979, patentees Mauer et al., discloses apparatus for concentrating radiant energy (such as solar radiation) which is collected over a large area to a smaller area. The apparatus includes a massive slab of transparent material having three layers of fluorescent dye material bonded to a major surface thereof. The outer layers contain a different type of dye then the middle layer. The layers are optically contacted with each other by using an index matching fluid. The first dye contained in the middle layer absorbs a shorter wavelength of light than the second fluorescent dye contained in the outer layers. Thus, radiation absorbed by the first fluorescent dye of the middle layer is converted to emitted radiation at a longer wavelength which is absorbed by the second fluorescent dye contained in the outer layers. This structure improves the efficiency of broad band absorption of the solar spectrum. The multiple layers of fluorescent material act as a single light pipe structure since the layers are optically contacted and have the same refractive index. Consequently, emitted light falling outside of the angle of internal reflection of the layers will leak out of the multilayer structure and remain uncollected, thus, reducing the efficiency of the disclosed structure. Moreover, the massiveness of the optically transparent slab, although suitable for solar collection, is not suitable for collecting radiation in an image scanner.

SUMMARY OF THE INVENTION

According to the present invention, there is provided a multi stage fluorescent radiation collector for an information scanner which obviates the disadvantages of known radiation collectors.

According to a feature of the present invention, there is provided an improved fluorescent radiation collector for an image scanner which has high efficiency; which is compact in size; which has good field uniformity; and which is low in cost. According to a further feature of the present invention, a fluorescent radiation collector is provided which is particularly suited for collecting monochromatic light in a monochromatic film image scanner, such as a medical X-ray film scanner. Another feature of the present invention is to provide a fluorescent radiation collector that is especially suited for collecting both diffuse and specular radiation in an information scanner.

According to an aspect of the present invention, a fluorescent radiation collector for an image scanner includes first and second elongated light pipe members which are adjacent to and optically isolated from one another. The first elongated member includes a first fluorescent dye dispersed in a transparent medium for absorbing radiation of a first wavelength and for emitting radiation of a second wavelength. A portion of the emitted radiation of the second wavelength is collected by internal reflection in the first elongated member and a portion escapes. The second elongated light pipe member includes a second fluorescent dye dispersed in a transparent medium for absorbing radiation of said second wavelength and for emitting radiation of a third wavelength. The second elongated member is located relative to the first elongated member to receive radiation of said second wavelength escaping from the first elongated member. According to a further aspect of the present invention, the fluorescent radiation collector includes a radiation sensor means positioned to receive the radiation emitted by the fluorescent dyes of said first and second members so as to convert said radiation into an electrical signal representative of the collected radiation.

According to a further aspect of the fluorescent radiation collector of the present invention, a third elongated light pipe member is provided. The third member includes a third fluorescent dye in a transparent medium for absorbing radiation of said third wavelength and for emitting radiation of a fourth wavelength. The third member is located relative to said second member to receive radiation emitted therefrom of said third wavelength that escapes from said second elongated member.

According to one embodiment of the present invention, the first, second and third elongated members of the fluorescent radiation collector respectively comprise, a central solid member, and concentric intermediate and outer hollow cylinders surrounding the central solid member.

In another embodiment of the present invention, the elongated radiation collecting members are rectangular in configuration and are arranged side by side.

According to a further aspect of the present invention, the fluorescent radiation collector includes an enclosure surrounding the elongated members and defining a slot to pass radiation to the first elongated member and preferably having reflective internal surfaces.

BRIEF DESCRIPTION OF THE DRAWINGS

In the detailed description of a preferred embodiment of the invention presented below reference is made to the accompanied drawings in which like numerals refer to like elements.

FIG. 1 is a block diagram of a laser scanner incorporating a fluorescent radiation collector according to the present invention;

FIG. 2 is a diagrammatic view useful in describing the operation of the present invention;

DESCRIPTION OF THE PREFERRED EMBODIMENT

Figure 3:
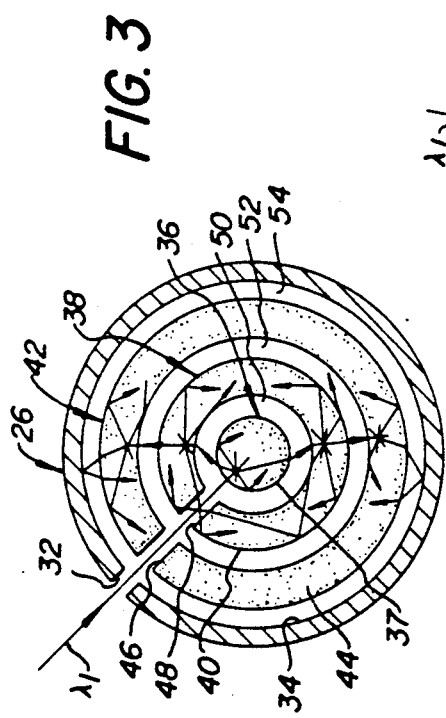
FIGS. 3 and 4 are respectively side elevational and front elevational views of one embodiment of fluorescent radiation collector according to the present invention.

Referring now to FIG. 1 there is shown a block diagram of a laser scanner useful in scanning X-ray film in which a collector of the present invention is used. As shown, laser 10 emits a laser beam of radiation which is swept across X-ray film 12 by means of scanner optics 14. Optics 14 may, for instance, comprise a rotating polygon mirror. Film 12 is placed on a flat platen which is mechanically driven at constant velocity past the laser beam by a mechanism not shown. The laser light transmitted from the film 12 being scanned is collected by radiation collector 16 and detected by radiation detector 18. Detector 18 may, for example, comprise photodiodes or the like. The signals produced by detector diodes 18 are amplified by operational amplifier (op amp) 20 and digitized by means of analog to digital converter (ADC) 22. The digital signals are stored in memory 24 which may comprise magnetic tape, magnetic disk or an optical disk.

In order to accurately digitize a medical X-ray film which has a large density range, (say 0 to 4) an array of low noise silicon photodiode/bipolar amplifer combinations are preferred to achieve the stringent signal to noise requirements for the laser scanner. However, due to the limited active area of photodiodes, the amount of light detected is quite small (less than 15% with 5 photodiodes coupled to a radiation collection tube). Moreover, there will be non uniformity in collected light along the scan line, the amount of non uniformity depending upon the locations of the photodiodes.

Figure 4:
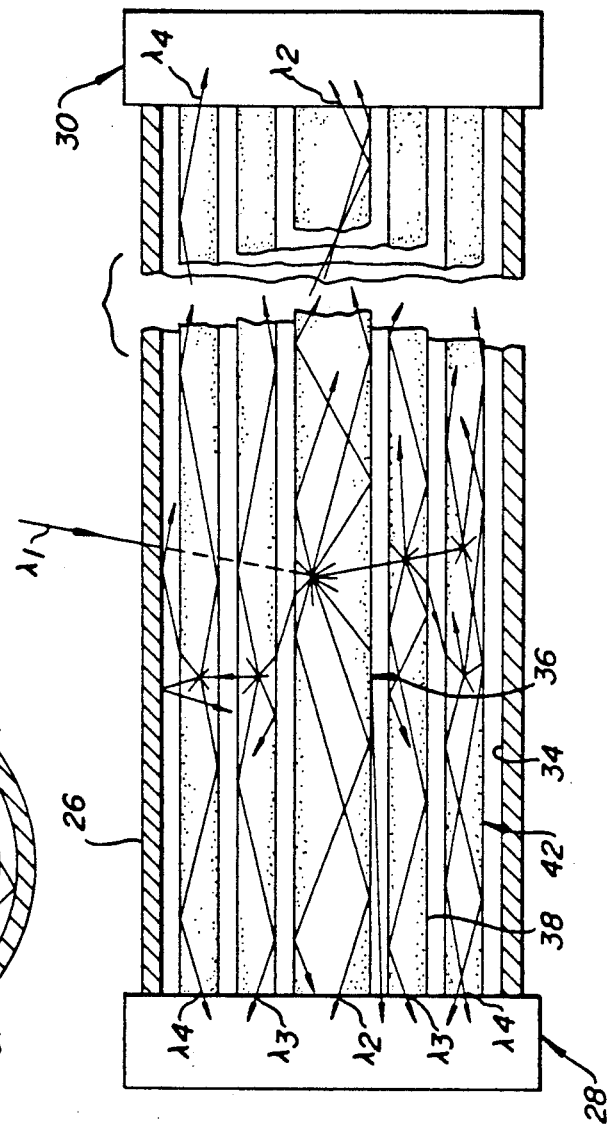

In order to improve radiation collection efficiency and in order to reduce non uniformities in radiation collection, according to the present invention, there is provided a multi stage fluorescent radiation collector. One embodiment of the invention is shown in FIGS. 2, 3 and 4. As shown in FIG. 2, the laser beam scans across film 12 in a scan line represented by dashed lines $L_1$, $L_2$ and $L_3$. The radiation transmitted from film 12 is collected by collector 16. As shown in FIGS. 3 and 4, radiation collector 16 comprises a cylindrical enclosure 26, having radiation detectors 28 and 30 mounted at the ends thereof. Enclosure 26 has a slot 32 for receiving scanning beam radiation transmitted from film 12 into the interior of enclosure 26. Enclosure 26 has an internal surface 34 having a mirror surface.

A first elongated light pipe member 36 is centrally located within enclosure 26 and extends between radiation sensors 28 and 30. Member 36 consists of a glass or transparent medium having dispersed therein a first fluorescent dye 37 which absorbs radiation of a first wavelength $\lambda_1$ and emits radiation of a second wavelength $\lambda_2$. A second cylindrically shaped elongated member 38 consists of an optical material having a second fluorescent dye 40 dispersed therein. Dye 40 absorbs radiation of a second wavelength $\lambda_2$ which leaks from member 36 and emits radiation of a wavelength $\lambda_3$.

A third, substantially cylindrical elongated light pipe member 42 surrounds member 38. Member 42 is concentric with enclosure 26 and members 38 and 36, and consists of a transparent material having dispersed therein a third fluorescent dye 44. Dye 44 absorbs radiation at wavelength $\lambda_3$ which leaks from light pipe member 38 and emits radiation at a fourth wavelength $\lambda_4$.

Radiation which leaks from member 42 is reflected by mirror surface 34 of enclosure 26 back into light pipe member 42.

Members 42 and 38 are respectively provided with aligned slots 46 and 48 which are aligned with slot 32 in enclosure 26 to permit radiation transmitted by film 12 of wavelength $\lambda_1$ to be absorbed in central light pipe member 36. The dye 37 in central member 36 strongly absorbs the emitted laser light of wavelength $\lambda_1$ and emits radiation of wavelength $\lambda_2$ in all directions. Since most of the emitted radiation is at angles greater than the critical angle for total internal reflection of light pipe member 36, this radiation is trapped in member 36 and propagated by successive reflections to the ends thereof to be detected by radiation sensors 28 and 30. Sensors 28 and 30 convert the sensed radiation into an electrical signal representative of the information contained in the transmitted laser beam of wavelength $\lambda_1$. The collection efficiency of member 37 is approximately 33%. Radiation emitted at wavelength $\lambda_2$, which is at angles less than the critical angle for total internal reflection, will leak from member 36 and be absorbed by the dye 40 in cylindrical light pipe member 38. This leaked radiation of wavelength $\lambda_2$ consists of about 67% of the radiation emitted by the dyes 37 of member 36. Radiation of wavelength $\lambda_2$ is absorbed by fluorescent dye 40 of member 38 and radiation of wavelength $\lambda_3$ is emitted. 33% of the radiation of wavelength $\lambda_3$ is internally reflected by member 38 and detected by radiation sensors 28 and 30. Approximately 67% of this radiation is leaked from member 38 and absorbed by dyes 44 in light pipe member 42. Dyes 44 emit radiation of wavelength $\lambda_4$ which is internally reflected within member 42 to the ends thereof to be detected by radiation sensors 28 and 30.

The radiation of wavelength $\lambda_4$ which leaks from member 42, is reflected back to member 42 by reflective surface 34 of enclosure 26.

Members 36, 38, 42, and enclosure 26 are respectively separated by cylindrical spaces 50, 52 and 54 which optically isolate adjacent members from one another.

Whereas a single fluorescent light pipe collector has a collection efficiency about 33% the multi stage cascading fluorescent radiation collector of FIGS. 3 and 4, increases the collection efficiency to as high as 70%. By having radiation sensors 28 and 30 at both ends of the radiation collector, non-uniformity due to leaky light and reabsorption phenomenon is greatly reduced. The fluorescent radiation collector of the present invention is specifically designed to maximize the collection of monochromatic light transmitted from a film (such as incorporated in a medical laser film scanner).

The fluorescent dyes to be used in the fluorescent collector 16 described above, depend on the collector design and the wavelength $\lambda_1$ of the radiation to be collected. Suitable dyes are the laser dyes marketed by the Exciton Chemical Co., Inc., P.0. Box 31126, Overlook Station, Dayton, Ohio 45431, and the laser dyes supplied by the Eastman Kodak Company, Rochester, N.Y. 14650. Exemplary fluorescent dyes for use in the radiation collector of FIGS. 3 and 4 are as follows: if the radiation being collected is assumed to be from a helium cadmium laser having a radiation wavelength $\lambda_1$ of 325 nanometers, then a suitable fluorescent dye 37 for central light collector 36 is $\alpha$-NPO (dissolved in ethanol) supplied by the Exciton company. This dye has a maximum absorption at wavelength of 329 nanometers and a maximum fluorescent radiation at wavelength of 398 nanometers. Fluorescent dye 40 of light pipe member 38 may be Coumarin 307 (dissolved in methanol) supplied by Eastman Kodak Company. This dye has a maximum absorption at wavelength of 395 nanometers and a maximum fluorescent radiation at wavelength of 488 nanometers. Fluorescent dye 44 of light pipe 42 may be DCM fluorescent dye dissolved in DMSO solvent. This dye is supplied by Eastman Kodak Company and has a maximum absorption at wavelength of 480 nanometers and a maximum fluorescent radiation at wavelength of 627 nanometers.

The fluorescent radiation collector of FIGS. 3 and 4 may be modified to eliminate the third light collector 42 to form a two stage radiation collector. If such a collector were used with a diode laser of gallium aluminum arsenide having a radiation wavelength of 750 nanometers, an exemplary dye 37 for central light pipe member 36 is IR 144 (dissolved in DMSO solvent) supplied by the Eastman Kodak Company. This dye has a maximum absorption at wavelength of 745 nanometers and a maximum fluorescent radiation at wavelength of 825 nanometers. An exemplary fluorescent dye 40 for light pipe member 38 would be IR 140 (dissolved in DMSO solvent) supplied by the Eastman Kodak Company. This dye has a maximum absorption at wavelength of 826 nanometers and a maximum fluorescent radiation at wavelength of 882 nanometers.

It should be noted that the absorption and fluorescent spectra of a fluorescent dye depend on the solvent and the concentration of the dye. However, by the proper selection of dye solvent and concentration, the desired absorption and fluorescent spectra can be obtained (as described in the catalogs of the dye suppliers, such as Kodak and Exciton).

Figure 5:
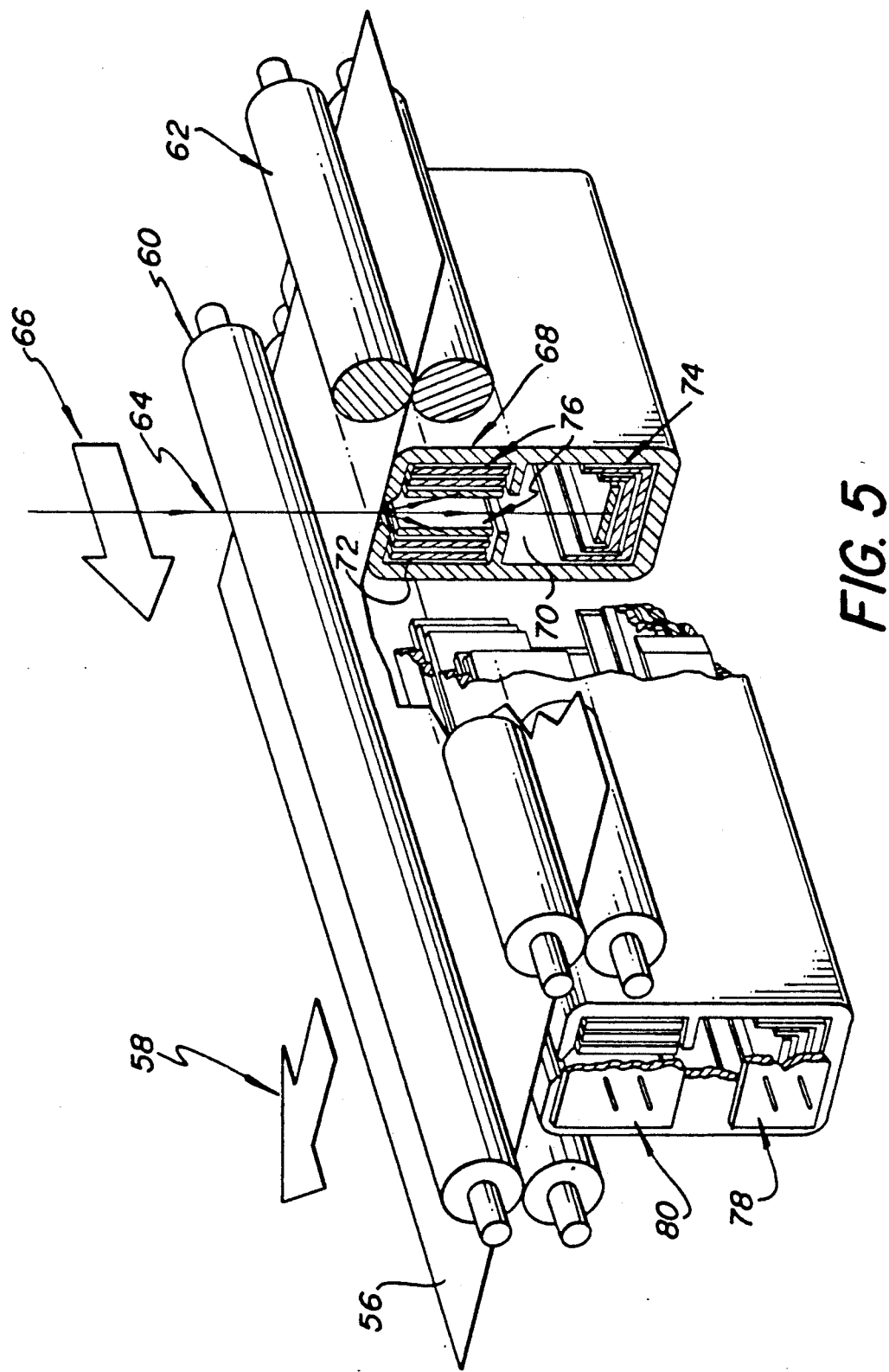
FIG. 5 is a perspective view of a film scanner incorporating another embodiment of the fluorescent radiation collector of the pr(sent invention.
Figure 6:
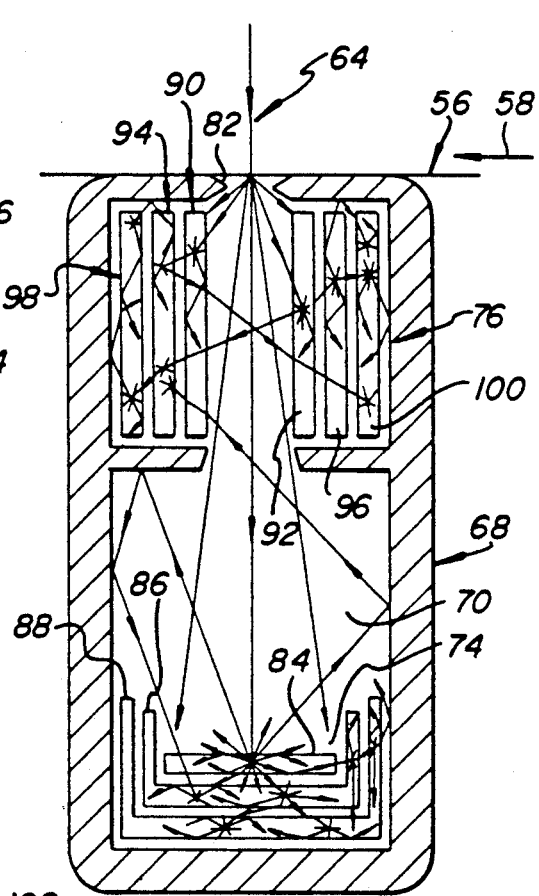

Referring now to FIGS. 5 and 6, there is shown another embodiment of the fluorescent radiation collector of the present invention incorporated into a film transport. As shown, a sheet of film 56, such as X-ray film, is moved in the direction of arrow 58 by means of sets of rollers 60 and 62. A radiation scan beam 64, which is produced by a scanning laser, is scanned across film 56 in the direction of arrow 66.

A fluorescent radiation collector, according to another embodiment of the present invention, is located below the film to receive both specularly transmitted radiation and diffusely transmitted radiation from film 56. The collector includes a mirror box 68 having internal mirror surfaces. Box 68 has lower and upper chambers 70 and 72 in which are located respective specular transmission collector section 74 and diffuse transmission collector section 76.

Radiation sensors 78 and 80 are mounted on the ends of box 68 to respectively detect radiation collected by collector sections 74 and 76.

As shown in greater detail in FIG. 6, mirror box 68 has a slot 82 which receives radiation 64 which is transmitted by film 56. Specular radiation transmission from film 56 is collected by collector section 74 in lower chamber 70 of box 68. Collector section 74 is a three stage design similar to the embodiment of FIGS. 3 and 4 but consists of flat light pipe members. Collector section 74 includes first elongated flat light pipe member 84 of transparent material and having a first fluorescent dye which absorbs radiation at wavelength $\lambda_1$ and emits radiation at a wavelength of $\lambda_2$. A second elongated U-shaped light pipe member 86 consists of transparent material having dissolved therein a second fluorescent dye which absorbs radiation of wavelength $\lambda_2$ and emits radiation of wavelength $\lambda_3$. Collector 74 includes a third U-shaped, elongated light pipe member 88 spaced from light pipe member 86. Member 88 is of transparent material and has dissolved therein a fluorescent dye which absorbs radiation of wavelength $\lambda_3$ and emits radiation of wavelength $\lambda_4$.

Specular radiation of wavelength $\lambda_1$ transmitted from film 56 not only is collected directly by light pipe collector 84, but also receives radiation which is reflected from the interior surfaces of mirror box 68. Similarly, radiation escaping from light pipe members 84, 86 and 88 are also reflected from the interior surfaces of mirror box 68 to increase the collection efficiency of the collector section 74.

A diffuse radiation collector section 76 includes a pair of flat elongated light pipe members 90 and 92 of transparent material having the first fluorescent dye dispersed therein. Flat, elongated light pipe members 94 and 96 are located parallel to members 90 and 92 and consist of transparent material having dispersed therein the second fluorescent dye. A third pair of light pipe members 98 and 100 are located parallel to and spaced from members 94 and 96 respectively. Members 98 and 100 consist of transparent material having dispersed therein said third fluorescent dye.

Collector section 76 collects diffuse radiation transmitted from film 56 of wavelength $\lambda_1$ which is absorbed by the first fluorescent dye of light pipe members 90 and 92 and emitted as radiation of a wavelength $\lambda_2$. Radiation with wavelength $\lambda_2$ emitted from members 90 and 92 is absorbed by the second dyes in light pipe members 94 and 96 which emit radiation of a wavelength $\lambda_3$. Emitted radiation of $\lambda_3$ is absorbed by the third dye in light pipe members 98 and 100 and emitted as radiation with wavelength $\lambda_4$. Light pipe members 84, 86 and 88 of section 74 and members 90, 92, 94, 96, 98, and 100 of section 76 transmit radiation which is internally reflected within the respective light pipes to radiation sensors 78 and 80 located at the ends of mirror box 68.

Figure 7:
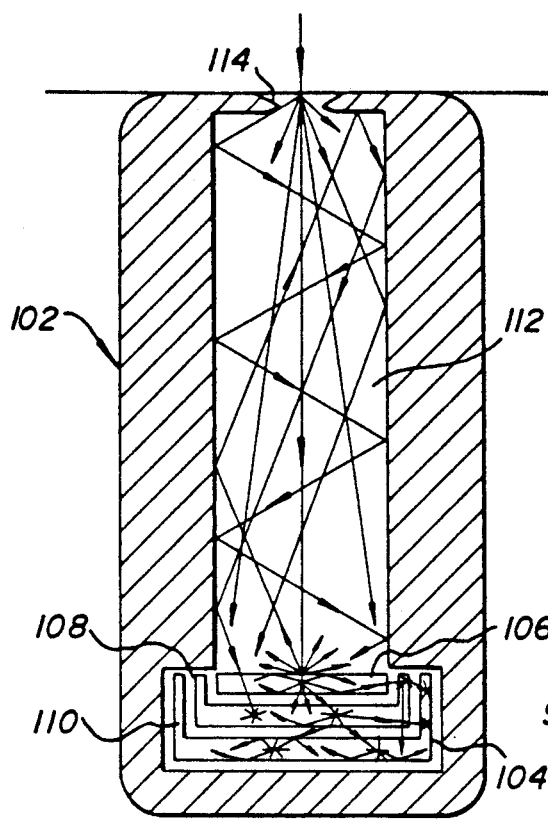
FIGS. 6 and 7 are respectively side sectional elevational views of further embodiments of the fluorescent radiation collector of the present invention.

Referring now to FIG. 7, there is shown another embodiment of the present invention which may be incorporated in the apparatus of FIG. 5. As shown, elongated mirror box 102 has a single, three stage collector section 104. Section 104 includes flat light pipe 106 with a first fluorescent dye; U-shaped light pipe member 108 with a second fluorescent dye; and U-shaped light pipe member 110 with a third fluorescent dye. The dyes of members 106, 108 and 110 serve the same function as the dyes of members 84, 86 and 88 of collector section 74 of the embodiment of FIG. 6. Section 104 is located at the end of a long mirrored cavity 112 disposed below slot 114 in box 102.

Figure 8:
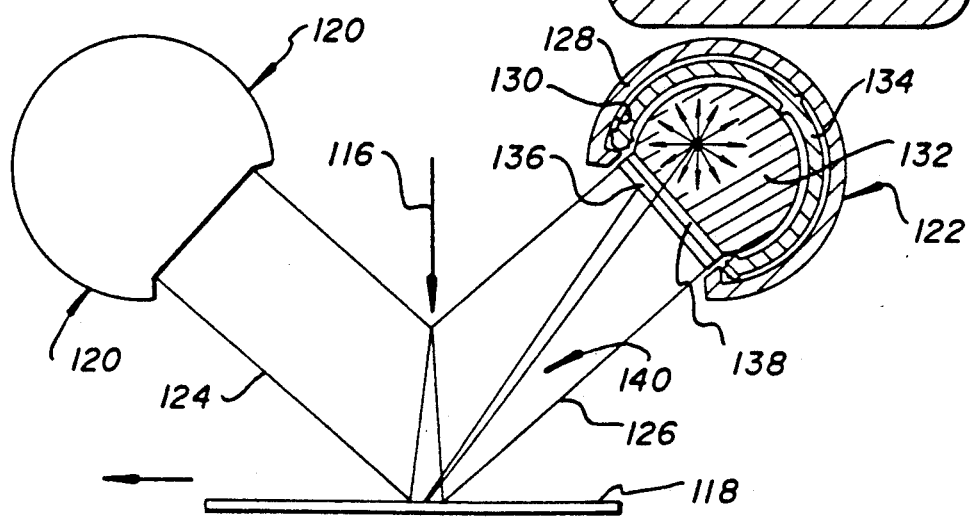
FIG. 8 is a schematic diagram of a fluorescent radiation collector according to the present invention employed in a stimulable phosphor film scanner.

Referring now to FIG. 8, there is shown in diagrammatic form another embodiment of the present invention which is useful in storage phosphor systems, such as disclosed in commonly assigned U.S. Pat. No. Reissue 31,847, reissued Mar. 12, 1985, inventor Luckey. As disclosed in this patent, a storage phosphor system includes a temporary storage medium, such as an infrared stimulable phosphor material, which is exposed to an incident pattern of high energy radiation such as X-rays. A time interval after exposure a small area beam of stimulating radiation scans the storage phosphor screen to release stored energy as light. An appropriate sensor receives the light emitted by the screen and produces electrical energy representative of the stored information.

According to the embodiment shown in FIG. 8, a scanning beam of radiation 116 (such as from a laser scanning source) irradiates storage phosphor screen 118 which emits radiation at a different wavelength than the wavelength of the scanning radiation beam 116. For example, scanning beam 116 may include red stimulating radiation and emit radiation of blue wavelengths.

According to the present invention, the fluorescent radiation collector includes a pair of multi-stage collectors 120 and 122 positioned on either side of the scanning beam 116. Collectors 120 and 122 are elongated, extend the width of storage screen 118, and are provided with radiation sensors at one or both ends thereof. Clear light pipes 124 and 126 respectively channel radiation emitted from screen 118 to fluorescent radiation collectors 120 and 122. Collector 122 includes outer enclosure 128 having a mirror coating on the interior surface 130 thereof. Central fluorescent light pipe 132 has dispersed therein a first fluorescent dye which absorbs radiation of the wavelength emitted by the storage phosphor screen 118 and emits radiation at a second wavelength. Semi-cylindrical fluorescent light pipe 134, is located between tube 128 and light pipe 132 and is optically spaced therefrom. Light pipe 134 has dispersed therein a second fluorescent dye which absorbs radiation at a wavelength emitted by the first fluorescent dye of light pipe 132 and emits radiation at a third wavelength.

A filter 136 absorbs radiation at the wavelength of scanning radiation beam 116 and includes a dichroic mirror 138 on the inner surface thereof. Mirror 138 permits the radiation 140 emitted by the storage phosphor screen to pass through to fluorescent light pipe 132 and prevents emitted radiation from light pipes 132 and 134 from leaking into filter 136.

As an example, it is assumed that radiation scanning beam 116 has a wavelength in the red light range and the storage phosphor of screen 118 emits radiation in the blue light wavelength. Screen 136 will absorb the red scanning radiation while allowing the emitted radiation in the blue wavelength to pass through to light pipe 132. Pipe 132 has a fluorescent dye which absorbs the blue radiation. Fluorescent light pipe 132 emits red radiation which is internally reflected to the ends of the light pipe to be sensed by radiation sensors (not shown). The red radiation which escapes from light pipe 132 is absorbed by the red absorbing fluorescent dyes in light pipe 134. These dyes emit infrared radiation which is internally reflected in light pipe 134 to the radiation sensors. Infrared radiation which escapes from light pipe 134 is channeled to the end detectors by mirror enclosure 128.

It will be understood that the fluorescent radiation collector according to the present invention may have any number of stages such as four, five or the like, which have suitable fluorescent dyes.

The invention has been described in detail with particular reference to preferred embodiments thereof. But it will be understood that variations and modifications can be effected within the spirit and scope of the invention.

What is claimed is:
1. A radiation collector for an image scanner comprising:
an enclosure defining a longitudinal slot for passing diffuse and specular radiation into said enclosure;
a first set of elongated fluorescent light pipe members positioned within said enclosure for receiving dif- fuse radiation passing through said slot and a second set of elongated fluorescent light pipe members positioned within said enclosure to receive specular radiation;

wherein each of said first and second set of light pipe members includes, a first elongated light pipe member having a first fluorescent dye dispersed in a transparent medium, for absorbing radiation of a first wavelength $\lambda_1$ and emitting radiation of a second wavelength $\lambda_2$, a portion of said emitted radiation being collected by said first elongated member and being internally reflected along the length of said first member, and a portion escaping; and a second elongated light pipe member having a second fluorescent dye dispersed in a transparent medium, for absorbing radiation of said second wavelength $\lambda_2$ and emitting radiation of a third wavelength $\lambda_3$, a portion of the emitted radiation of said third wavelength $\lambda_3$ being collected by said second elongated member and being internally reflected along the length of said second member, said second elongated light pipe member being located adjacent to but optically isolated from said first elongated light pipe member to receive said radiation of said second wavelength escaping from said first elongated member.

2. The radiation collector of claim 1 wherein a portion of said radiation of said third wavelength $\lambda_3$ escapes from each of said second elongated light pipe members, and wherein each of said sets further comprises a third elongated light pipe member having a third fluorescent dye dispersed in a transparent medium for absorbing radiation of said third wavelength $\lambda_3$ and emitting radiation of a fourth wavelength $\lambda_4$.

3. The radiation collector of claim 1 wherein said enclosure has a reflective internal surface for reflecting radiation along the length of said enclosure.

4. The radiation collector of claim 2 wherein said enclosure has a reflective internal surface for reflecting radiation along the length of said enclosure.

5. The radiation collector of claim 1, wherein each of said first elongated light pipe members defines a solid rod, and each of said second elongated light pipe members defines, a hollow cylinder surrounding said first elongated member, and a longitudinal slot for passing radiation to said first elongated member.

6. The radiation collector of claim 2, wherein each of said first elongated members defines a solid rod, each of said second elongated members defines, a hollow cylinder surrounding said first elongated member and a longitudinal slot for passing radiation to said first elongated member, and each of said third elongated members defines, a hollow cylinder surrounding said second elongated member and a longitudinal slot aligned with said longitudinal slot defined by said second elongated member for passing radiation to said first elongated member.

7. The radiation collector of claim 5, wherein said enclosure slot is aligned with said slot defined by each of said second elongated members for passing radiation to said first elongated member, and said enclosure has a reflective internal surface for reflecting radiation along the length of said enclosure.

8. The radiation collector of claim 6, wherein said enclosure slot is aligned with said slot defined by each of said third elongated members for passing radiation to said first elongated member, and said enclosure having a reflective internal surface for reflecting radiation along the length of said enclosure.

9. A radiation collector for an image scanner comprising:

a first elongated light pipe member having a first fluorescent dye dispersed in a transparent medium, for absorbing radiation of a first wavelength $\lambda_1$ and emitting radiation of a second wavelength $\lambda_2$, a portion of said emitted radiation being collected by said first elongated member and being internally reflected along the length of said first member, and a portion escaping;

a second elongated light pipe member having a second fluorescent dye dispersed in a transparent medium, for absorbing radiation of said second wavelength $\lambda_2$ and emitting radiation of a third wavelength $\lambda_3$, a portion of the emitted radiation of said third wavelength $\lambda_3$ being collected by said second elongated member and being internally reflected along the length of said second member, said second elongated light pipe member being located adjacent to but optically isolated from said first elongated light pipe member to receive said radiation of said second wavelength escaping from said first elongated member;

wherein a portion of said radiation of said third wavelength $\lambda_3$ escapes from said second elongated light pipe member, a third elongated light pipe member having a third fluorescent dye dispersed in a transparent medium for absorbing radiation of said third wavelength $\lambda_3$ and emitting radiation of a fourth wavelength $\lambda_4$;

a plurality of sets of said first, second, and third elongated fluorescent light pipe members, surrounded by an enclosure defining a longitudinal slot for passing radiation to said first elongated members of said sets, and having a reflective internal surface for reflecting radiation along the length of said enclosure; and wherein said plurality of sets includes two sets of elongated fluorescent light pipe members located adjacent said longitudinal slot defined by said enclosure, one set respectively on either side of said slot for collecting diffuse radiation, and a third set of elongated fluorescent light pipe members located in said enclosure directly across from said longitudinal slot for collecting specular radiation.

10. A stimulable phosphor storage screen readout system comprising:

scanning means including a scanning source and scanning optics, a radiation collector including, an enclosure defining longitudinal slot for passing diffuse and specular radiation into said enclosure;

a first set of elongated fluorescent light pipe members positioned within said enclosure for receiving diffuse radiation passing through said slot and a second set of elongated fluorescent light pipe members positioned within said enclosure to receive specular radiation;

wherein each of said first and second set of light pipe members includes, a first elongated light pipe member having a first fluorescent dye dispersed in a transparent medium, for absorbing radiation of a first wavelength $\lambda_1$ and emitting radiation of a second wavelength $\lambda_2$, a portion of said emitted radiation being collected by said first elongated member and being internally reflected along the length of said first member, and a portion escaping;

a second elongated light pipe member having a second fluorescent dye dispersed in a transparent medium, for absorbing radiation of said second wavelength $\lambda_2$ and emitting radiation of a third wavelength $\lambda_3$, a portion of the emitted radiation of said third wavelength $\lambda_3$ being collected by said second elongated member and being internally reflected along the length of said second member, said second elongated light pipe member being located adjacent to but optically isolated from said first elongated light pipe member to receive said radiation of said second wavelength escaping from said first elongated member; and detection means responsive to radiation collected by said radiation collector.

11. The stimulable phosphor storage screen readout system of claim 10, wherein each of said first elongated light pipe members defines a solid rod, and each of said second elongated light pipe members defines, a hollow cylinder surrounding said first elongated member and a longitudinal slot for passing radiation to said first elongated member.

12. The stimulable phosphor storage screen readout system of claim 11 further comprising a transparent light pipe having an entrance edge adjacent a line of stimulation on said stimulable phosphor storage screen to collect radiation emitted from the stimulable phosphor, and an exit edge arranged in the longitudinal slot defined by said second elongated members an din contact with said first elongated members.

13. The stimulable phosphor storage screen readout system of claim 12, further comprising filter means disposed between said exit edge and each said first elongated member for absorbing wavelengths of radiation employed to stimulate said stimulable phosphor storage screen, and for passing wavelengths of radiation emitted by said phosphor storage screen.

* * * * *